United States Patent [19]
Weir

[11] 3,792,785
[45] Feb. 19, 1974

[54] AUTOMATED STORAGE AND FREIGHT TERMINAL APPARATUS

[75] Inventor: Stanley M. Weir, Santa Clara, Calif.

[73] Assignee: FMC Corporation, San Jose, Calif.

[22] Filed: Jan. 26, 1973

[21] Appl. No.: 326,932

[52] U.S. Cl. ...... 214/16.4 A, 198/102, 214/16.1 CF, 198/181
[51] Int. Cl. ............................................. B65g 1/06
[58] Field of Search ............ 214/16.4 A, 16.4 B, 14, 214/16.1 CC, 16.1 CD, 16.1 CE, 16.1 CF, 214/16.1 CB, 16 B

[56] References Cited
UNITED STATES PATENTS

| | | | |
|---|---|---|---|
| 1,969,002 | 8/1934 | Gleichman.................. | 214/16.1 CF |
| 3,405,817 | 10/1968 | Alimanestianu............. | 214/16.1 CB |
| 3,613,910 | 10/1971 | Weir............................ | 214/16.4 A |
| 3,622,020 | 11/1971 | Sarvary........................ | 214/16.4 A |

FOREIGN PATENTS OR APPLICATIONS 594,677  3/1960  Canada........................ 214/16.1 CF

*Primary Examiner*—Gerald M. Forlenza
*Assistant Examiner*—R. B. Johnson
*Attorney, Agent, or Firm*—R. S. Kelly; C. E. Tripp

[57] ABSTRACT

An automated freight terminal wherein a plurality of stacker cranes transfer shipments between load-unload boom conveyors, shipment staging compartments, and an indexible distribution conveyor comprised of a series of interconnected carts. The stacker cranes are provided with elevators, and each elevator supports an endless belt conveyor that can be side-shifted toward selected carts of the distribution conveyor or toward staging compartments which components are also provided with endless belt conveyors. The conveyors on the carts or in the staging compartments are powered from the stacker crane conveyor, and shipments can be moved off the crane conveyor onto the conveyors of the compartments or cart, or vice versa. Incoming freight shipments are routed from a truck to a boom conveyor to a stacker crane, and the stacker crane transfers the shipments directly to the staging compartments or to the distribution conveyor for transfer to the operating area of another stacker crane. The distribution conveyor is indexed in predetermined distances to bring different sets of carts to the stacker cranes so that shipments can be routed anywhere in the terminal. Outgoing freight shipments are handled in a reverse manner.

17 Claims, 12 Drawing Figures

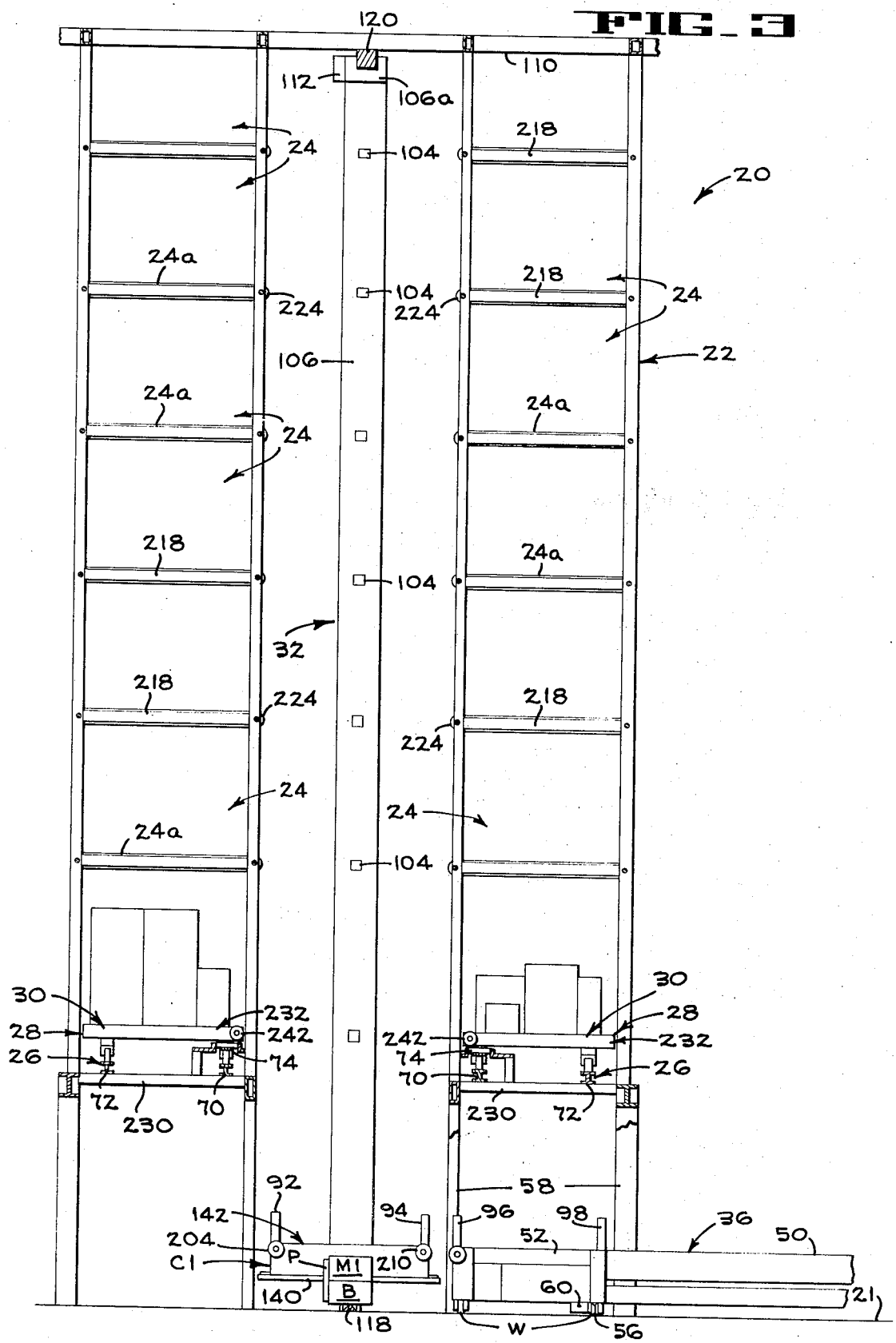

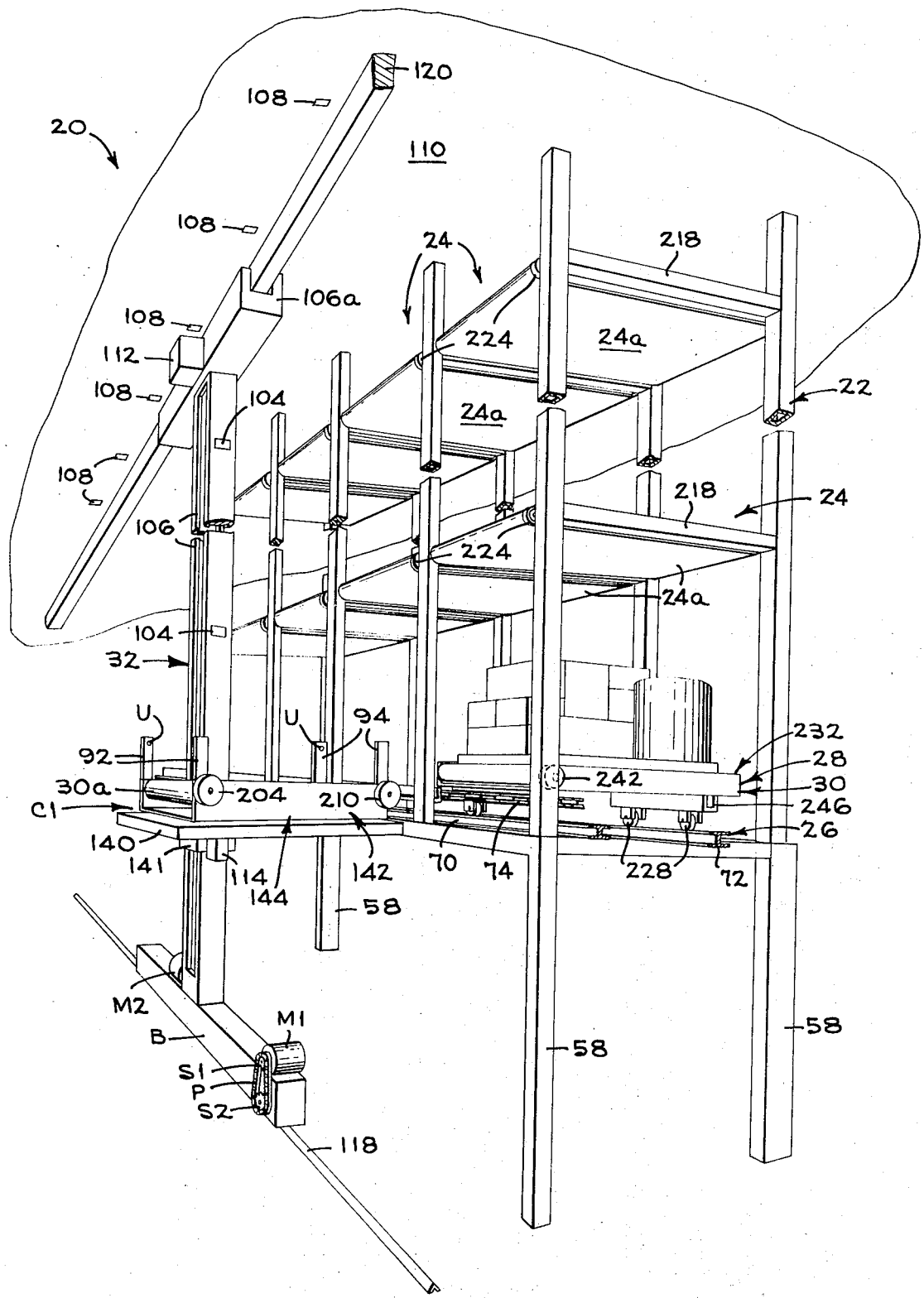

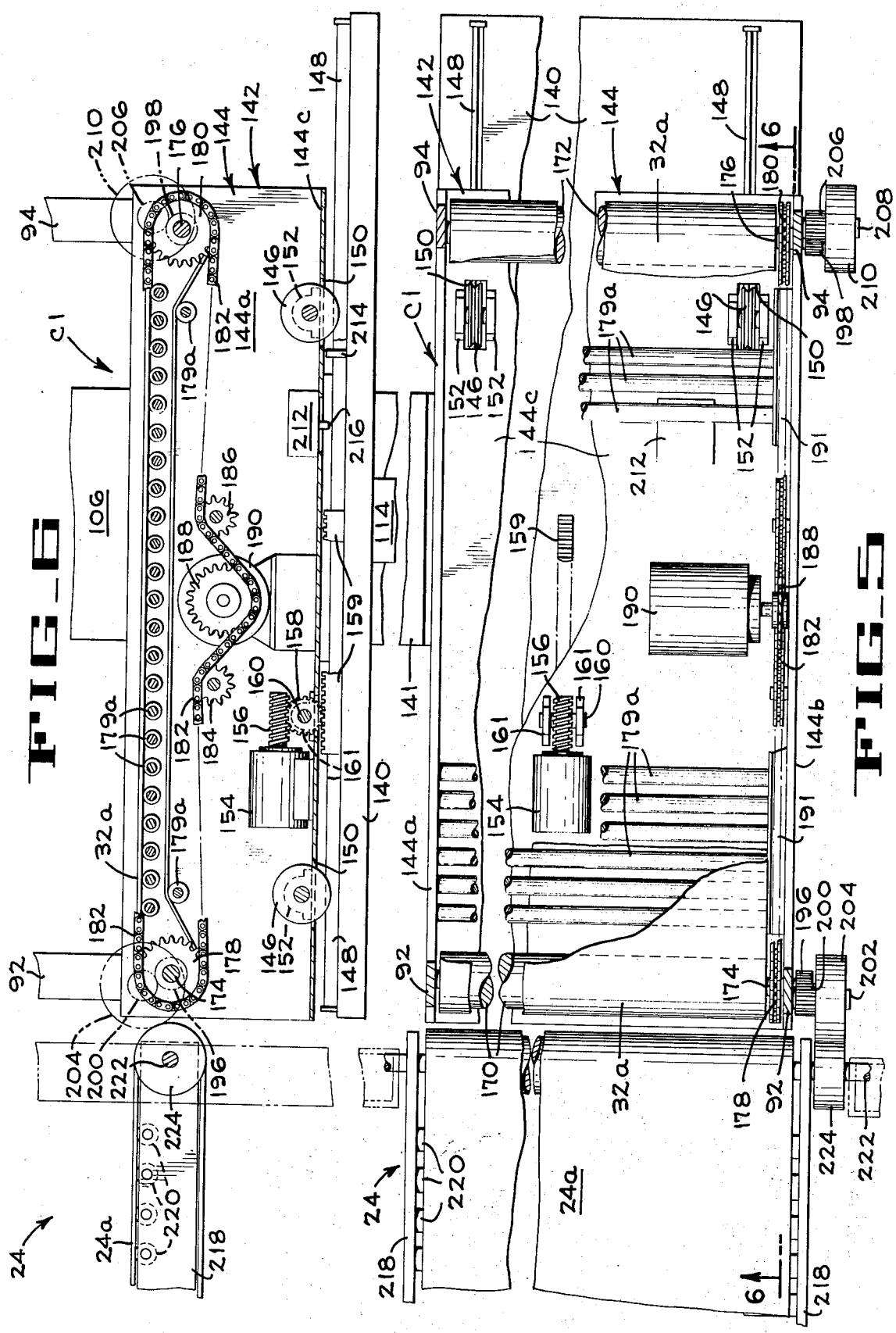

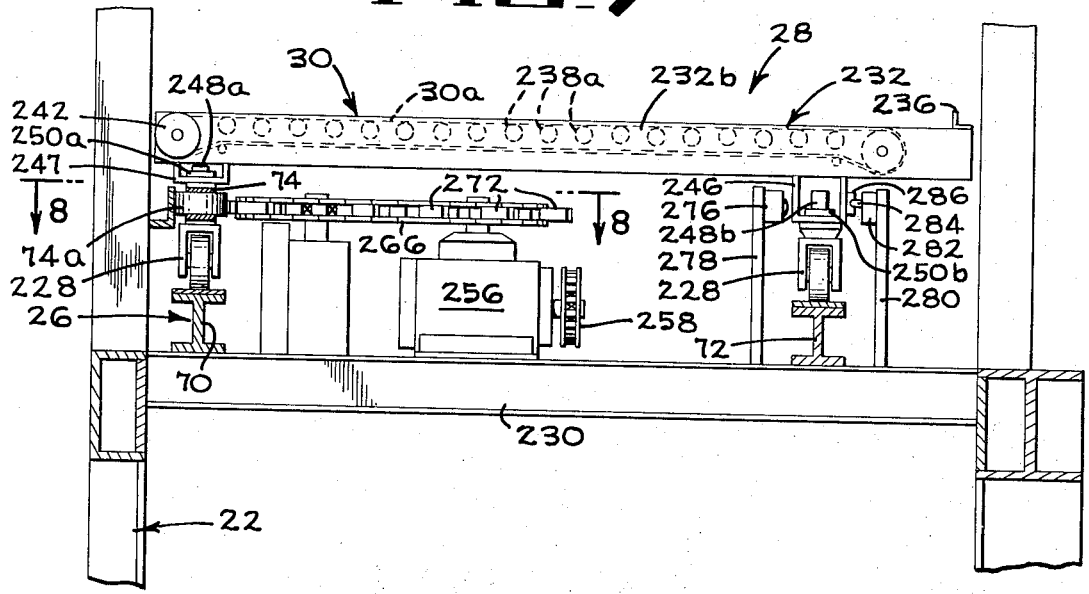
FIG_7
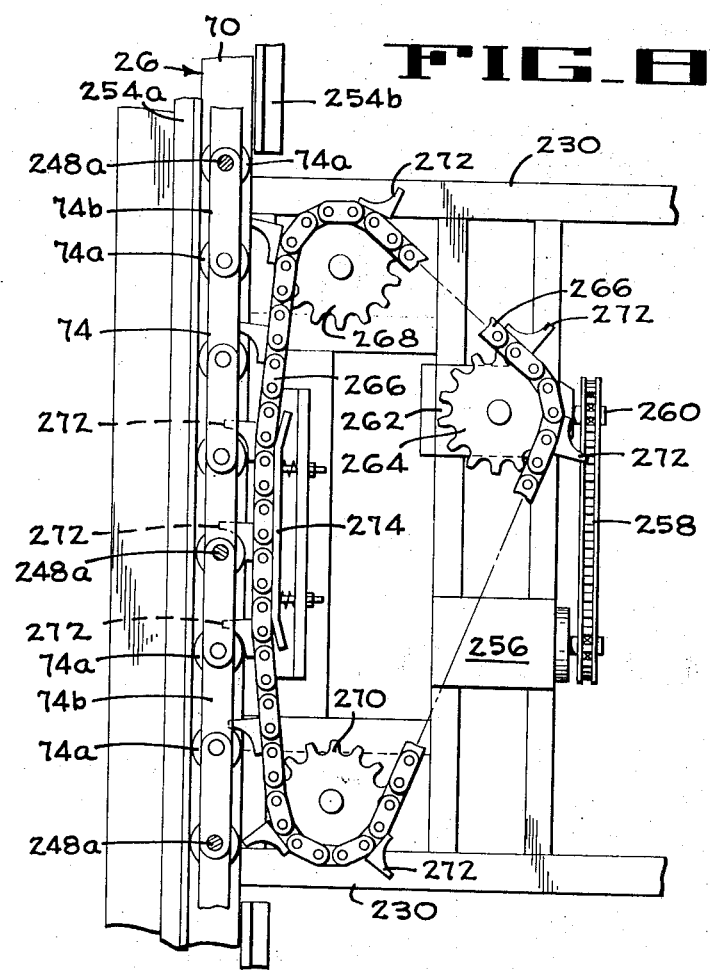
FIG_8

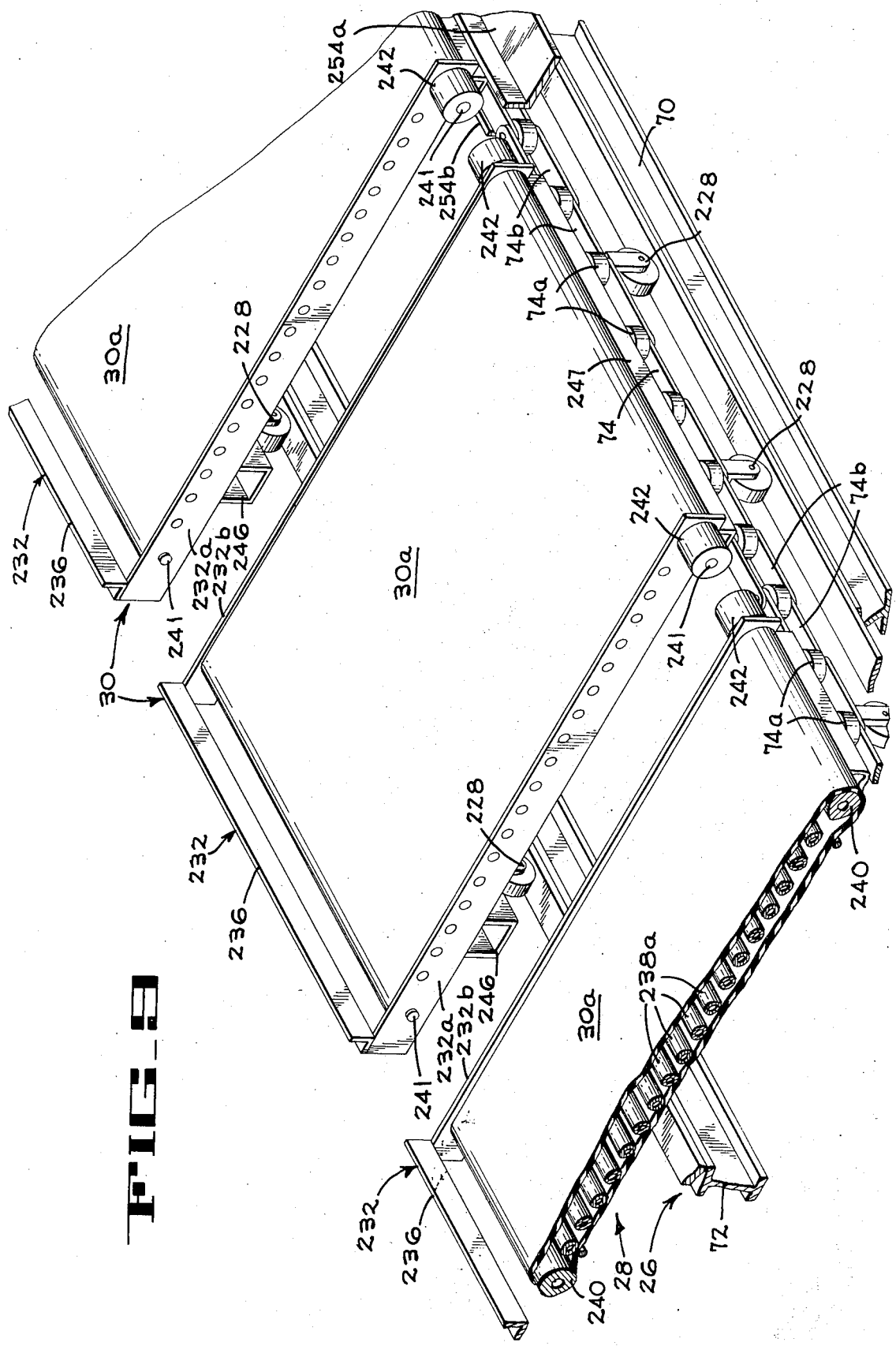

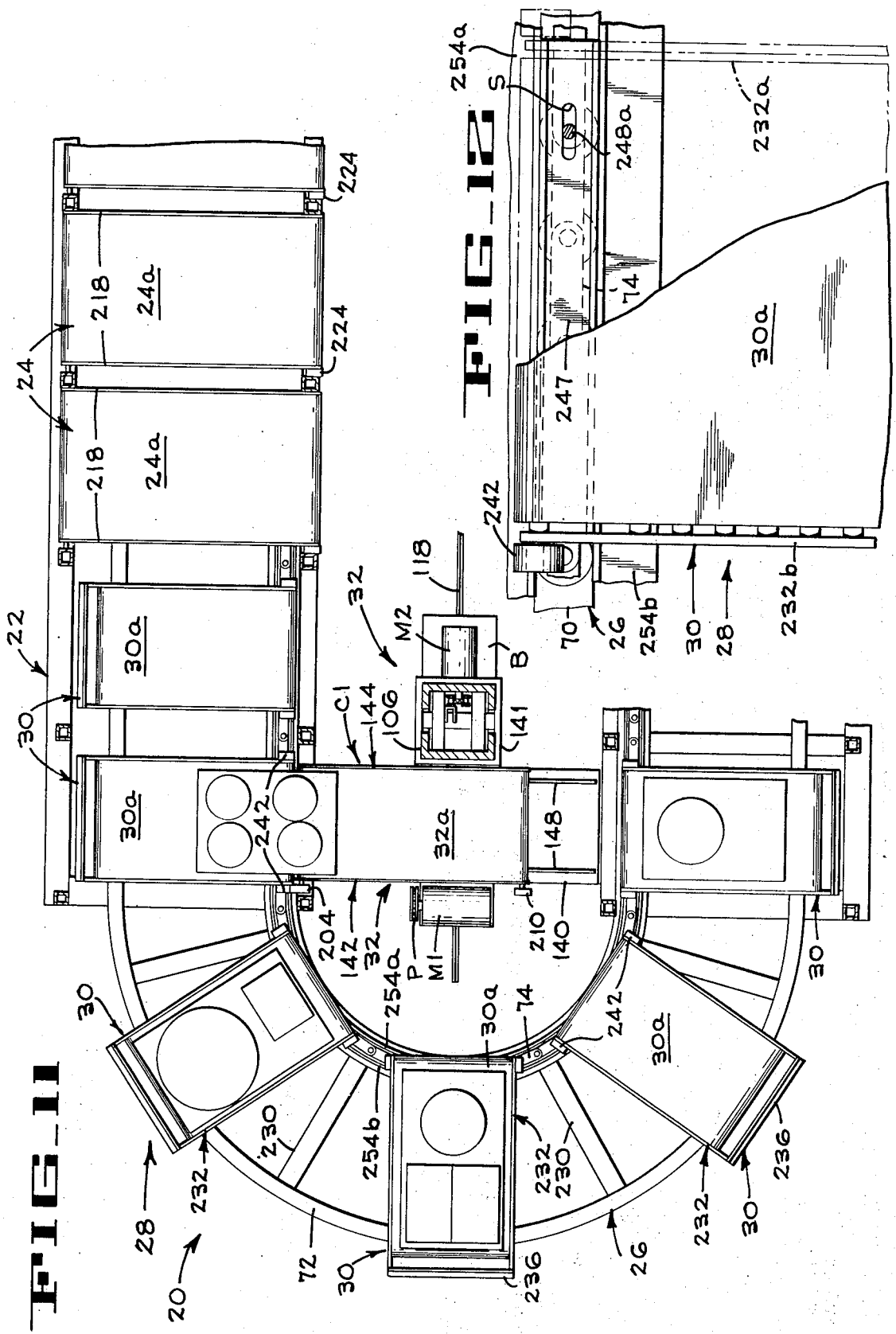

AUTOMATED STORAGE AND FREIGHT TERMINAL APPARATUS

BACKGROUND OF THE INVENTION

1. Field of the Invention

This invention relates to improvements in an automated freight handling terminal system. The illustrated terminal is a truck terminal, but the invention is applicable to other freight handling terminals as well.

2. Description of the Prior Art

The transferring of less-than-container-load shipments (LTL) to and from transportable freight containers at a freight handling terminal of the type disclosed in my prior U.S. Pat. No. 3,613,910 involves routing the shipments from freight containers to staging compartments and the conveying of the shipments from the compartments to other freight containers. In the daily operation of such a terminal the shipments are moved into and out of the terminal in a constantly changing shipment traffic pattern that requires concurrent movement of some shipments out of the terminal into freight containers and movement of shipments into the terminal out of other freight containers. Efficient terminal operation requires that the freight handling equipment form an automated system capable of sorting, staging and subsequently loading out shipments in the desired sequence and at low cost and high speed.

The terminal shown in my prior U.S. Pat. No. 3,613,910 includes a framework of staging compartments, stacker cranes for transferring shipments to and from the compartments, a distribution conveyor for transferring shipments between stacker cranes, and load-unload boom conveyors for transferring shipments between freight containers and the stacker cranes. In the aforesaid terminal freight shipments are loaded into or unloaded from freight containers by fixed length boom conveyors. The containers (e.g., truck trailers) are parked on support platforms that can be shifted to move the containers relative to the boom conveyors. The boom conveyors are used to transport shipments from the containers into the terminal. Stacker cranes pick up the shipments from the boom conveyors and deliver them (1) directly into the staging compartments, or (2) to another load-unload boom conveyor, or (3) to the distribution loop conveyor. The stacker cranes also operate to remove shipments from staging compartments and deliver them to the load-unload boom conveyors which transport them into the containers.

Each stacker crane has sideshifting load supporting and transferring fingers which can be extended or retracted to effect transfer of shipments to or from the cranes. The cranes transfer shipments to a constantly moving distribution conveyor which is used to circulate shipments within the terminal. Shipments deposited on the distribution conveyor by one stacker crane can be removed from the distribution conveyor by another stacker crane, and thus shipments are transported and distributed throughout the terminal for providing the desired sorting.

SUMMARY OF THE INVENTION

The instant invention relates to an improved terminal system of the type shown and described in my prior U.S. Pat. No. 3,613,910. The system is able to automatically handle a wide range of sizes, shapes, and weights of shipments.

The present invention involves the provision of an improved freight handling terminal wherein stacker cranes, which service staging compartments, cooperate in a unique way with carts of an indexing distribution conveyor so that freight can be placed by cranes on the carts and moved on the carts from the vicinity of one stacker crane to the vicinity of another stacker crane which will remove the freight from the carts. In the terminal, the cranes, distribution conveyor carts, and staging compartments are all provided with conveyor means which coact to effect load transfer from a crane to a compartment or vice versa and from a crane to a cart or vice versa.

In the improved terminal of the present invention each stacker crane conveyor means includes a mechanism operable to sideshift the conveyor means toward the conveyor means of a selected staging compartment or cart of the loop distribution conveyor. The sideshifting motion places a stacker crane conveying means into drive interengagement with the conveying means of the selected cart or staging compartment in order to synchronously operate the coupled conveying means so that load transfer can be accomplished.

The improved terminal also includes an indexing mechanism that produces indexing (stop and go) motion of the distribution conveyor to move a predetermined number of distribution conveyor carts from one stacker crane operating area to another stacker crane operating area so that loads can be transferred anywhere in the terminal.

Other objects, advantages, and features of the present invention will become apparent upon review of the following detailed description taken in conjunction with the figures of the accompanying drawings.

BRIEF DESCRIPTION OF THE DRAWINGS

FIG. 3 is an enlarged section taken along line 3—3 of FIG. 2.

FIG. 4 is a fragmentary perspective, with parts broken away, showing the relationship between a stacker crane, nearby columns of staging compartments, and a distribution conveyor in accordance with the present invention.

FIG. 5 is a plan view showing a stacker crane elevator sideshifted toward a staging compartment.

FIG. 6 is a section taken along line 6—6 of FIG. 5.

FIG. 7 is an enlarged section taken along line 7—7 of FIG. 2 showing a distribution conveyor cart and the means for driving the same.

FIG. 8 is a horizontal section taken along line 8—8 of FIG. 7.

FIG. 9 is a fragmentary perspective view illustrating the conveyor carts of the distribution conveyor of the present invention.

FIG. 11 is a fragmentary, multilevel plan view further showing the physical relationship of the distribution conveyor of the present invention to the staging compartments and a particular stacker crane.

FIG. 12 is a fragmentary plan view, with portions broken away, of a portion of a distribution conveyor cart of the present invention.

DESCRIPTION OF A PREFERRED EMBODIMENT

Figure 1:
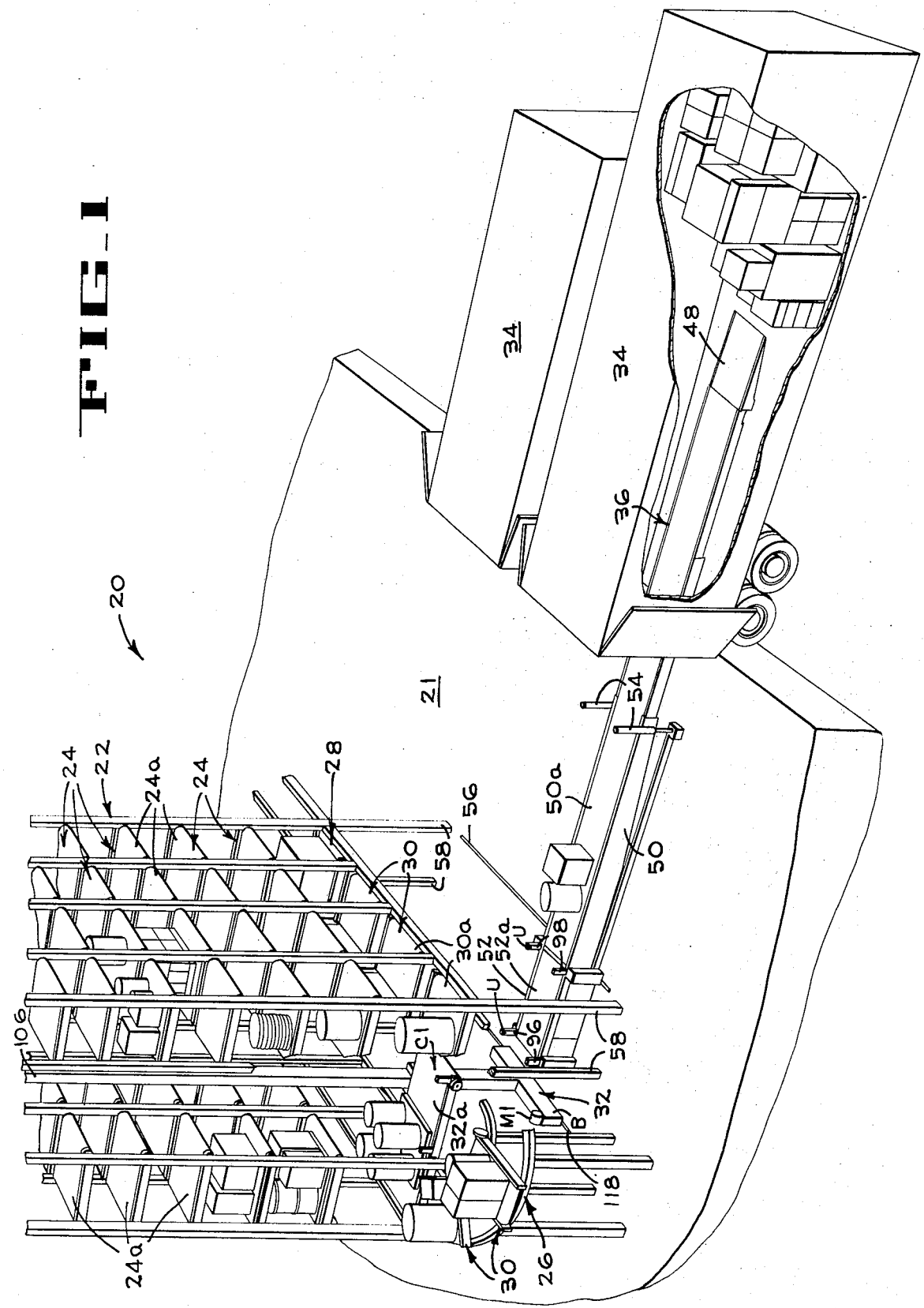
FIG. 1 is a fragmentary, perspective view, with parts broken away, of an automated freight terminal according to the present invention showing an end section of the terminal framework and illustrating the movement of goods into the terminal on a load-unload boom conveyor.

The drawings illustrate a particular freight handling terminal that is constructed in accordance with the teachings of the present invention. In different figures of the drawings certain components may be omitted in order to better illustrate the present invention.

A freight terminal 20 (FIGS. 1-4) includes a multilevel framework 22 (FIG. 1) of shipment staging compartments 24 built on a freight terminal platform 21. A distribution conveyor track way 26 at the lowest framework level is supported on horizontal beams above the platform between the vertical framework posts. Framework 22 forms two parallel rows of staging compartments 24 as diagrammatically illustrated in FIG. 2.

Figure 2:
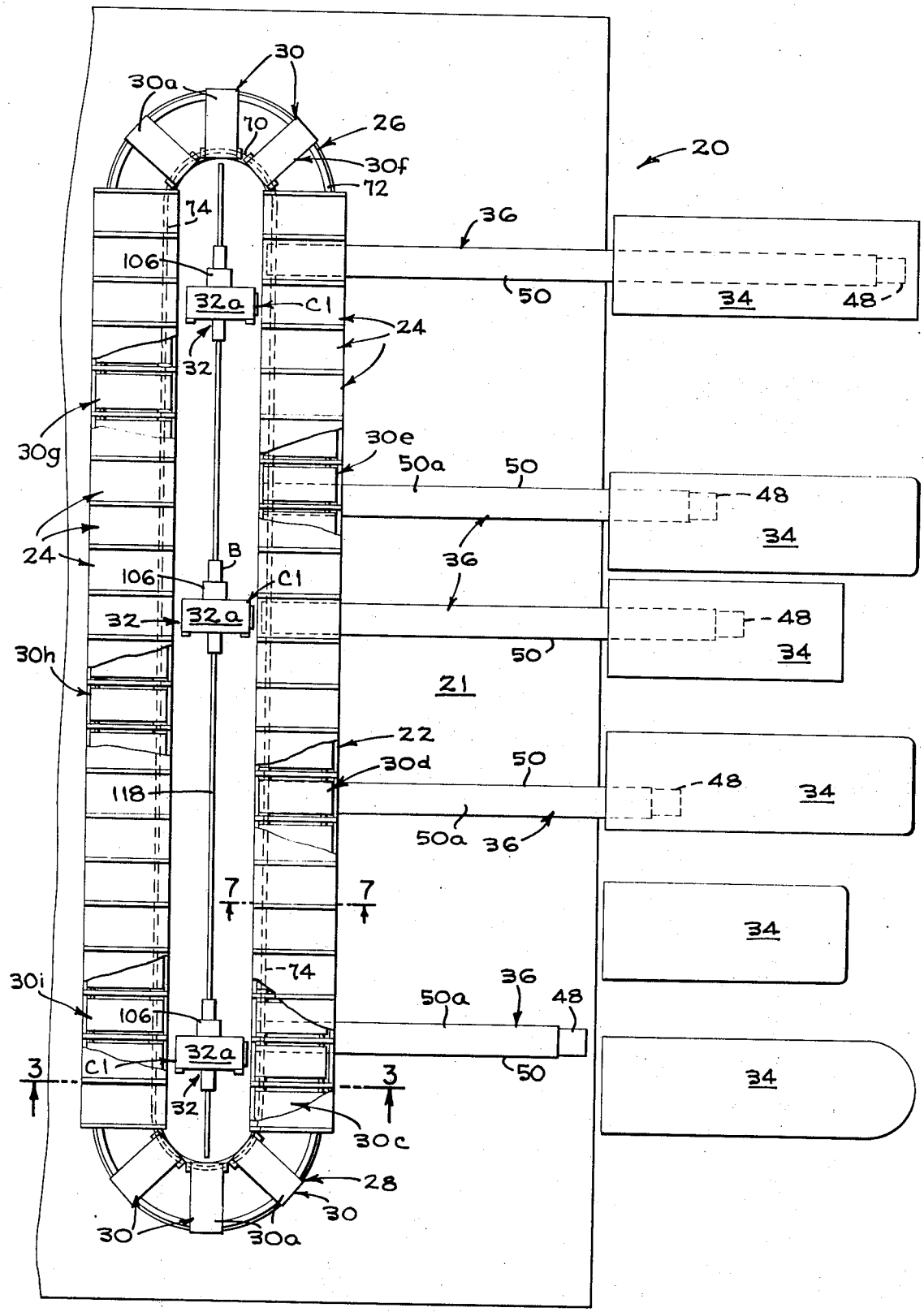
FIG. 2 is a schematic plan view of the freight terminal shown in FIG. 1.

FIG. 1 shows two opposed sections of staging compartments each including four vertical columns of individual staging compartments 24. Framework 22 comprises a plurality of such sections aligned in two rows as is indicated in FIG. 2. The sections shown in FIG. 1 are at one end of the framework where a segment of distribution conveyor trackway 26 curves 180° between respective ends of each row to interconnect the rows with the distribution conveyor system. A distribution conveyor 28, operating on trackway 26, is comprised of a plurality of carts 30 that are interconnected by a tow chain 74 (FIG. 9). A plurality of stacker cranes 32 operate between the compartment rows to deliver loads to or from the staging compartments 24.

Trailer vans 34 parked adjacent to the terminal platform 21 (FIG. 1) are loaded or unloaded at the terminal 20. A load-unload boom conveyor 36 on the terminal platform is used to convey unitized freight loads from inside the vans 34 to a stacker crane 32 located between the rows of staging compartments 24 and is also used to convey the loads from a stacker crane into the trailer vans. Loads delivered to a stacker crane by the boom conveyor 36 are then delivered to a selected staging compartment 24 which information is recorded, by a computer for example. The loads are ultimately removed from the various compartments by a stacker crane and transferred back to a boom conveyor 36 which takes them to the vans or other shipping containers in a desired sequence. Shipment sorting and sequencing operations may be computer controlled so that the desired loads will be placed in the proper container in the proper sequence in accordance with the system described in my aforementioned prior U.S. Pat. No. 3,613,910.

Stacker cranes 32 move along a fixed path between the compartment rows to carry loads to and from staging compartments 24 or to carry loads to and from the conveyor carts 30 of the distribution conveyor 28. In order to provide for such transfer operations, each staging compartment 24 includes an endless conveyor belt 24a, each cart 30 includes an endless conveyor belt 30a, and each stacker crane 32 includes an endless conveyor belt 32a which is supported on an elevatable portion of the crane. These endless conveyor belts are used to transfer loads in a manner which will be described in detail hereinafter.

The boom conveyor 36 includes a powered ramp 48, an extensible conveyor section 50, and a transfer conveyor 52. The ramp 48 includes a plurality of interdigitating fingers (described in U.S. Pat. No. 3,613,910) which can be set into orbital motion to move shipments to the extensible conveyor section 50 or vice versa. The extensible conveyor section 50 of the boom conveyor is provided with an endless conveyor belt 50a having an upper run whose length can be changed by conventional belt take-up means (not shown). The boom conveyor 36 can be elevated to handle loads at different levels within the vans 34 by means of hydraulic lift mechanisms 54 mounted near the edge of the platform 21.

Transfer conveyor 52 includes an endless conveyor belt 52a, separate from conveyor belt 50a, that can be driven in synchronism with the conveyor belt 50a or independently as desired. This conveyor is operated to transfer loads to and from the associated stacker crane 32.

Each boom conveyor 36 is mounted on wheels W (FIG. 3) that allow it to shift sideways between vertical framework posts 58 at the ends of each staging compartment section, as shown in FIG. 1. The wheels W run along a guide track 56 (FIG. 1) on the terminal platform 21. A hydraulic motor 60, (FIG. 3) coupled to one of the wheels W, is operated to shift conveyor 36 sideways so that it can be aligned with the desired van 34.

The terminal framework 22 includes, as illustrated in FIGS. 1-4, several levels of staging compartments 24 forming two compartment rows on opposite sides of several automated stacker cranes 32 that service the staging compartments and also service the carts 30 of the distribution conveyor 28 as previously explained. Distribution conveyor carts 30 circulate on trackway 26 to carry freight loads to different points in the terminal 20. Distribution conveyor 28 moves in index (stop and go) fashion along trackway 26 to intermittently move carts 30 along a closed loop path that runs along the length of each compartment row. The distribution conveyor is stopped when loads are exchanged between stacker cranes 32 and the various conveyor carts 30.

When activated (by means to be explained in greater detail hereinafter), the distribution loop conveyor 28 moves a predetermined distance and then stops so that a set of carts move out of reach of one stacker-crane and into the reach of an adjacent stacker crane. In accordance with the present invention certain of the carts are provided with means (to be described in detail hereinafter) to cause the conveyor to stop as each of the certain carts pass a monitoring point in the system. Carts are thereby always stopped in designated positions around the loop so that their locations (when stopped) are known.

For example, FIG. 2 shows a terminal 20 wherein three stacker cranes 32 operate between two rows of staging compartments 24. The distribution conveyor 28 will be seen to comprise 48 interconnected carts. Each stacker crane will service 14 carts 30 (seven in each staging compartment row). It will be seen therefore that it would be desirable to index the distirbution conveyor 28 by seven cart lengths each time the conveyor is moved so that a new set of carts will be presented to the operating area of each stacker crane. In order to accomplish this, selected carts 30c, 30d, 30e, 30f, 30g, 30h and 30i are provided with means whereby they can be monitored so that as each of these carts pass a preselected point in the loop, the conveyor will stop. The conveyor is started again from a signal from the control system (a computer, for example) which will indicate that all transfer operations have taken place between the stacker cranes and the carts. It will be noted that there are seven cart lengths between each of 30c, 30d, 30e, 30f, 30g, 30h and 30i (except for the six cart spacing between 30i and 30c at the end of each cycle). As explained previously, the particular means for starting and stopping the carts will be described in greater detail hereinafter.

Trackway 26 comprises two parallel tracks 70, 72. Carts 30 are uniformly spaced apart so that the spacing between the centers of adjacent carts equals the center to center spacing of two horizontally adjacent staging compartments 24. Adjacent carts 30 are spaced apart, as shown in FIGS. 9 and 11, so that they do not touch each other when they traverse the curved trackway segments at the ends of the compartment rows. Carts 30 are interconnected by an endless tow chain 74 (FIG. 9) that is set into motion to pull them along the tracks 70 and 72.

Each stacker crane 32 carries an optoelectronic unit on its elevator. Each transfer conveyor 52 is provided with a reflective target, such as a strip of light reflecting tape. The optoelectronic unit includes a light source and a photocell oriented so that movement of a stacker crane elevator into vertical and horizontal alignment with the target of an adjacent transfer conveyor 52 causes a beam of light projected from the light source to be reflected by the target onto the photocell, and associated control circuitry and mechanisms are activated to automatically halt movement of the aligned stacker crane and its elevator and to then cause automatic sideshifting of the crane's conveyor belt 32a toward the aligned transfer conveyor to permit transfer of loads therebetween.

From FIGS. 3 and 4 it will be noted that each stacker crane 32 has two opposed sensing posts 92 and two opposed sensing posts 94 located adjacent to and at either end of the endless conveyor 32a on the elevatable portion of the crane. Transfer conveyor 52 has two opposed sensing posts 96 and two opposed sensing posts 98 provided at opposite ends of its endless conveyor belt 52a as best shown in FIG. 1. Optoelectronic reader units U (FIG. 4) on one post of each of the sets of posts 92, 94, 96, 98 cooperates with an aligned reflective target on the other opposed post of the sets of posts 92, 94, 96, 98 to control movement of loads from transfer conveyor 52 to extensible conveyor section 50 and vice versa and to control movement of loads from transfer conveyor 52 to crane 32 and vice versa. The optoelectronic reader units U comprise a light source and a photocell. Each light source projects a beam of light which is reflected to the associated photocell by the aligned target on the opposed post when no portion of a shipment is disposed therebetween. Each unit U associated with each pair of posts 92, 94, 96, 98 thereby senses the presence or absence of a load between the posts and responds to movement of a load into position between the posts and also responds to movement of a load from a position between the posts. Logic and control circuitry connected to units U responds to electrical signals generated as a result of a change from illumination to non-illumination of the associated photocell, or vice versa, by activating, or deactivating, the adjacent conveyors in order to move a load from one conveyor to the next.

For example, movement of an incoming shipment load on conveyor belt 50a into position between posts 98 can cause automatic start up movement of transfer conveyor belt 52a to effect transfer of a load to the transfer conveyor 52 as soon as the leading end of the load moves between posts 98. When the trailing end of the transferred load passes beyond the posts 98 an automatic stoppage of conveyor belt 52a can be effected while the load waits to be transferred to a stacker crane 32. Similarly, the movement of a load from transfer conveyor belt 52a past posts 96 onto crane conveyor belt 32a may suffice to automatically halt the running movement of belt 52a as soon as the trailing end of the load passes the posts 96. Similarly, subsequent passing of posts 94 or of posts 92 by the trailing end of a load which is moving off of crane conveyor belt 32a during load transfer to a staging compartment 24 or a cart 30 may suffice to automatically halt the running movement of the crane's conveyor belt. Thus, the optoelectronic units of the posts 92 and 94 of the stacker crane are usable to control the movement of shipment loads onto and off of the crane's conveyor belt 32a.

As illustrated in FIG. 4, the control system for controlling the movement and operation of each stacker crane 32 includes vertically spaced magnetic code bars 104, one for each level of staging compartments 24, situated on stacker crane vertical standard 104. Magnetic code bars 108, one for each vertical column of compartments 24, are situated on the ceiling 110 of a building containing the staging compartment framework 22. A conventional code reader 112 mounted adjacent the top end of standard 106 senses the alignment of code bars 108 thereby indicating alignment of the associated stacker crane with one of the staging compartment columns. Elevation code reader 114 is supported on the undercarriage of the elevatable portion of the crane to sense alignment of the code bars 104 to thereby indicate the vertical alignment of the elevator with particular levels of framework 22.

The code readers 112 and 114, which may be conventional magnetic bar code readers, are part of the stacker crane control system and function to generate electrical signals to indicate the horizontal position of a particular stacker crane 32 and the vertical position of its elevator and conveyor 32a. Control signals controlling the operation of a stacker crane motor M1 (FIG. 4) and elevator lift motor M2 are fed to a crane control unit, from a computer for example, and interact with signals from the code readers 112 and 114 to start and stop the movement of the crane and crane elevator in order to properly position the elevator to provide for the effective transfer of loads.

Each stacker crane 32 (see FIG. 4) includes a base B which is supported on wheels contained therein that ride on a floor track 118. An overhead rail 120, suspended from the ceiling 110, extends parallel to the floor track and guides the enlarged top end 106a of crane standard 106 during horizontal movement of the crane. Crane motor M1 is coupled to the crane support wheels by a chain P trained about two sprockets S1 and S2, as illustrated in FIG. 4. The lower sprocket S2 is affixed to a shaft supporting one of the wheels (not shown) in the base so that motor M1 operates to turn the wheel in order to move the crane along track 118. Elevator motor M2 powers an elevator lift mechanism (not shown) including a vertical drive chain in the interior of crane standard 106 that is coupled to the crane elevator C1 (FIG. 10) which includes the conveyor belt 32a. Conventional logic and control circuitry are utilized to control the operation of motors M1 and M2.

Figure 10:
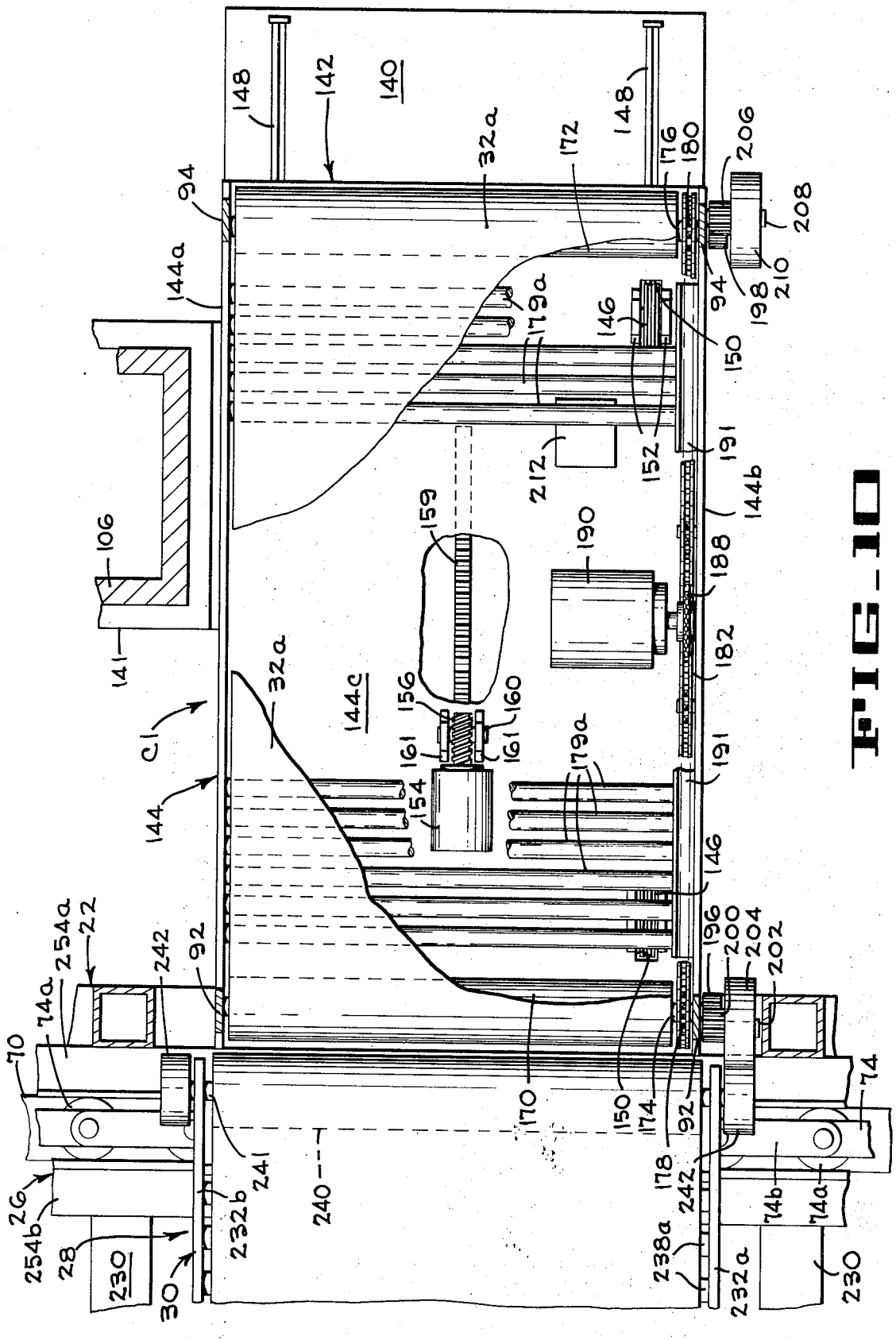
FIG. 10 is a plan view showing the crane conveyor shideshifted toward a cart of the distribution conveyor.

FIGS. 5, 6 and 10 depict an illustrative crane elevator C1 which includes a fixed elevator platform 140 and a conveyor support structure 142 which is movably mounted upon the platform. The platform has a laterally extending supporting bracket 141 which is arranged to be slidably attached to the vertical standard 106 and connected to the lift mechanism in order to provide for vertical movement of the endless conveyor belt 32a. As shown in FIGS. 5 and 6, the conveyor support structure 142, which is laterally translatable upon the platform 140, is shown sideshifted on the platform to make possible the transfer of a load from the associated endless conveyor belt 32a to one of the conveyor belts 24a of a staging compartment 24. Conveyor support structure 142 includes a channel shaped frame 144 comprised of a pair of opposed side panels 144a, 144b and a bottom panel 144c. The frame 144 rests upon the elevator platform 140 and provides support for the endless conveyor belt 32a and the other conveyor components. Four supporting wheels 146 are rotatably secured to the bottom panel 144c by means of axles which are supported by pairs of spaced journal blocks 152. The wheels protrude through four openings 150 in the bottom panel 144c and are arranged to run on two parallel tracks 148 provided upon the upper face of the platform 140.

Each stacker crane conveyor belt 32a can be moved sideways, to the left or right of a centered position on the standard 106, by means of a reversible drive motor 154 which is mounted on bottom panel 144c of frame member 144. The drive motor 154 rotates a worm screw 156 that engages a worm wheel 158 (FIG. 6) meshing with the teeth of a rack 159 carried upon platform 140. Drive motor 154 includes a torque limiter mechanism that causes automatic turnoff of the motor whenever the torque load imposed on the worm screw 156 exceeds a certain value. Worm wheel 158 is affixed to a shaft 160 that is journalled in blocks 161 mounted on the panel 144c. The worm screw 156 can be made to revolve in either direction, by operating motor 154 in forward or reverse directions, to sideshift conveyor support structure 142.

Each of the endless belts 32a of the stacker cranes is trained around two drums 170 and 172 mounted on shafts 174 and 176, respectively, whose end portions are journalled in the side panels 144a and 144b of the frame member 144. Cylindrical rollers 179a, whose ends are journalled in the side panels 144a and 144b, engage and support the upper run of conveyor belt 32a while two snub rollers 179b, whose ends are also journalled in side panels 144a, 144b, engage and elevate the lower run of belt 32a. Each drum supporting shaft 174 and 176 carries a sprocket 178 and 180, respectively, disposed near side panel 144b. An endless drive chain 182 is looped around sprockets 178 and 180 and also passes over a pair of guide sprockets 184 and 186 which are secured to stub shafts journalled in the adjacent side panel 144b. The drive chain 182 engages a drive sprocket 188 which is affixed to the output shaft of a reversible drive motor 190 that can be operated to set belt 32a into motion to move its upper run either to the left or right as viewed in FIG. 6. The upper run of chain 182 is further guided by a guide bracket 191 secured to the upper edge of side panel 144b (FIGS. 5 and 10).

Shaft 174 projects laterally beyond side panel 144b (FIGS. 5 and 10) and carries at its end a gear 196. Shaft 176 projects laterally beyond side panel 144b and carries at its end a gear wheel 198. Gear 196 meshes with a gear 200 on a stub shaft 202, journalled on panel 144b, which carries at its distal end a rubber-faced friction drive wheel 204. Gear 198 meshes with a gear 206 on a stub shaft 208, journalled in the side panel 144b, which carries at its distal end a rubber-faced friction drive wheel 210. The drive wheels 204 and 210 have their leading edges positioned laterally of the conveyor support structure 142 (FIG. 6) so that they may drive the conveyor belts 24a of the staging compartments and the conveyor belts 30a of the distribution conveyor carts in a manner to be explained hereinafter. The driving of adjacent conveyor belts 24a or 30a will occur when the conveyor support structure is sideshifted by means of motor 154, as will be apparent from FIGS. 5, 6 and 10.

Motor 154 is operated to return conveyor support structure 142 from a sideshifted position to a centered position on the standard 106 wherein it will automatically come to a stop due to actuation of a limit switch mechanism 212 (FIG. 6) by a switch operating member 214 mounted on the fixed platform 140. Switch mechanism 212 is mounted over an opening in panel 144c and includes a depending actuating arm 216 which extends downwardly through the opening so that it can be engaged by the upright member 214 when the conveyor support structure 142 is centered over the platform 140. The switch mechanism 212 is connected so as to open the motor circuit and thereby stop the operation of motor 154. Independent starting circuitry is used to initiate the operation of motor 154 when it is desired to sideshift the conveyor belt 32a.

The conveyor belt 24a of each staging compartment 24 (see FIGS. 5 and 6) is trained about two shaft mounted drums at opposite ends of the belt. The ends of each drum supporting shaft are journalled within opposed compartment side panels 218 which comprise a mounting frame structure for the conveyor belt. A plurality of closely spaced, transverse cylindrical rollers 220 are also rotatably mounted between side panels 218 to provide support for the upper run of the belt 24a. The drum supporting shaft, identified by numeral 222, at the input-output end of each staging compartment has an end portion that projects beyond the adjacent side panel 218 and carriers a metal engagement wheel 224. The engagement wheels 224 of opposed staging compartment conveyor belts 24a in opposed compartment rows are located directly opposite to each other whereby a stacker crane 32 can be positioned therebetween so that the friction drive wheels 204 and 210 of the crane conveyor can be sideshifted into engagement with the staging compartment engagement wheels 224 to effect joint movement of abutting conveyor belts 24a and 32a and, therefore, transfer of loads from one belt to the other.

To transfer a load from a stacker crane's conveyor belt 32a to a staging compartment conveyor belt 24a, the crane elevator C1 is first moved into vertical and horizontal alignment with the selected staging compartment, as shown in FIGS. 5 and 6, whereupon drive motor 154 is automatically turned on to sideshift the conveyor support structure 142 toward the selected compartment 24 moving the friction drive wheel 204 (or 210) into pressure contact with the engagement wheel 224 of the selected compartment. As wheel 204 moves into engagement with wheel 224 an increasing torque load is developed on the worm screw 156 until the torque limiter mechanism of motor 154 turns off the motor. The stopping of motor 154 is automatically followed (by means of conventional control circuitry) by the starting of motor 190 which operates to move the conveyor belt 32a and conveyor belt 24a in the same direction to carry a load from belt 32a onto the belt 24a. When the trailing end of the load bypasses the sensing posts 92 (as shown in FIG. 6) of crane elevator C1, the optoelectronic unit on one of the posts 92 functions to automatically turn off motor 190 after a short delay that allows enough time for the load to be completely transferred onto the staging compartment belt 24a. As soon as motor 190 is stopped, the motor 154 is started (but in the reverse direction) to return the conveyor support structure 142 to its centered position over the platform 140 whereupon member 214 engages switch actuator arm 216 to stop motor 154 in the manner previously explained. When it is desired to transfer a load from a staging compartment 24 to the crane elevator C1, the procedure is the same except that motor 190 operates in a reverse direction to drive conveyor belts 24a and 32a so as to cause them to move the load from the compartment belt 24 a onto the crane belt 32a. As the trailing end of the load bypasses the sensing posts 92 the associated optoelectronic unit again turns off motor 190 and starts motor 154 to re-center the elevator on the crane.

FIG. 7 shows one of the distribution conveyor carts 30 which will be seen to be supported by castered wheels 228 on the tracks 70 and 72. The tracks are supported on transverse horizontal beams 230 which are part of the framework 22 of the terminal. Each cart 30 includes (see FIG. 9) a support frame 232, including side panels 232and 232b and a connecting angle iron 236 at the outer, or rear, end of the cart. A plurality of transverse rollers 238a are aligned across the cart in closely spaced relationship to support the upper run of the conveyor belt 30a with the ends of such rollers being journalled in the side panels 232a and 232b. A pair of guide rollers are also provided to support the lower run on conveyor belt 30a with the ends of these rollers also being journalled in the side panels 232a and 232b. The endless conveyor belt 30a is trained about two drums 240 (FIG. 9) at the front and rear ends of the cart. Each drum 240 is mounted on a shaft 241 whose end portions are rotatably supported by the side panels 232a and 232b. The front drum shaft projects through the side panels to carry metal engagement wheels 242 laterally of the cart and in a position to be engaged by the friction drive wheels 204 or 210 of the stacker crane elevator C1.

Adjacent carts 30 are connected by the aforementioned tow chain 74 which chain is a bushed roller chain (see FIGS. 7, 8 and 9) including tubular roller wheels 74a held by vertical pins between connecting links 74b. Each cart 30 includes two laterally extending channel members 246 and 247 which underlie and support the side panels 232a and 232b. The channel member 246 at the outer end of the cart supports the castered wheels 228 for travel over the track 72, as shown in FIG. 7. The channel member 247 also supports two castered wheels 228 one of which extends through a slot S (see FIG. 12) in the channel member. Each castered wheel assembly that is connected to channel member 247 includes a vertical pin 248a extending through a hole (not shown) or slot S of the channel member. Each castered wheel assembly connected to channel member 246 includes a vertical pin 248b extending through the channel member. The two pins 248b of the castered wheels 228 resting on track 72 are fastened to the channel member 246 by nuts 250b (one only being shown in FIG. 7). The two pins 248a of the two castered wheels resting on track 70 are fastened to channel member 247 by means of nuts 250a (one only being shown in FIG. 7). Each pin 248a extends through a chain roller wheel 74a so that each channel member 247 is connected at two points to the tow chain 74. The caster pin 248a extending through slot S can shift back and forth (relative to the supporting channel member) so that the distance between the two caster pins 248a can change slightly as the associated cart 30 moves around the curved portion at the ends of trackway 26 to compensate for the curvature imparted to chain 74. The slot-mounted pin 248a can shift relative to its associated pin 248a as the cart moves in a curved path so that the chain links 74b which are connected between the two caster pins 248a will remain taut at all times.

To guide the movement of cart wheels 228 on tracks 70 and 72 two elongated opposed guide members 254a and 254b (FIG. 8) are provided to define a guide path between them for the tow chain 74. The guide member 254a is suitably supported alongside chain 74 and includes a vertical guide face disposed at one side of chain rollers 74a. Guide member 254b is suitably supported and disposed opposite the guide member 254a and includes a vertical face disposed at the opposite side of chain rollers 74a. Guide member 254b is cut away at one section (see FIG. 8) to permit a drive chain to engage the tow chain 74 in order to provide the driving power therefor.

The distribution conveyor 28 is driven by a motor drive system as shown in FIGS. 7 and 8. This system includes a drive motor 256. A chain 258 couples a sprocket on the motor's output shaft to a sprocket on the input shaft 260 of a speed reduction unit 262 (FIG. 8) having an output sprocket 264. An endless link chain 266 is looped around sprocket 264 and around idler sprockets 268 and 270 and is provided with outwardly projecting spurs 272 that are arranged to fit between the links 74b of chain 74 to engage and drive the chain rollers 74a. Idler sprockets 268 and 270 are affixed to rotatable shafts journalled in housings in the mounting frame structure. A spring-biased plate 274 urges chain 266 into driving engagement with the two chain 74.

The motion of distribution conveyor 28 is, of course, controlled by the operation of its drive motor 256. To turn off motor 256 an optoelectronic sensing uint 276 (FIG. 7) is mounted on a stub post 278 and is arranged to cooperate with a reflective tape target (not shown)

carried by the inner face of the channel member 246 of the selected carts in the conveyor system, i.e., carts 30c, 30d, 30e, 30f, 30g, 30h and 30i. The sensing unit 276 and the targets on the selected carts cooperate to stop the motion of distribution conveyor 28 by stopping motor 256 (through conventional control circuitry) whenever a target becomes optically aligned with a sensing unit 276.

Each optoelectronic sensing unit 276 includes a light source and a photocell. A beam of light projected by the light source will be reflected back onto the photocell by the target of a particular cart (30c–30i) whenever such cart carries its target into optical alignment with the sensing unit. The illumination of the photocell by the reflected light stops the drive motor 256 thus halting movement of distribution conveyor 28 whereupon it then is possible to utilize the stacker cranes 32 to deposit loads onto or remove loads from the various carts 30 within their operating zones. A second stub post 280 (FIG. 7) supports a limit switch mechanism 282 that has a switch actuator arm 284 projecting therefrom. Each cart (30c–30i) that is provided with a reflective target also carries a tab 286 secured to the opposite side of channel member 246 which tab is movable into contact with actuator arm 284 for a purpose to be explained presently.

In the illustrated embodiment of the invention, the distribution conveyor drive motor 256 is arranged to be automatically turned on by a computer signal, from the control computer, occurring either (1) at the end of a suitable dwell time interval during which distribution conveyor 28 is stationary so that load transfer between carts and stacker cranes or between stacker cranes and staging compartments can be accomplished, or (2) after positive control signals are fed to the computer indicating that all desired transfer operations have been accomplished. When a target on a cart becomes optically aligned with unit 276 the motor 256 is turned off by conventional control circuitry. When the distribution conveyor 28 comes to a stop, the arm 284 of switch mechanism 282 will be spaced just slightly downstream from the tab 286 on the targeted cart. After the desired load transfer interval, the motor 256 is restarted and the control unit 276 is deactivated by appropriate circuitry in order to permit the renewed travel of the distribution conveyor. After motor 256 has been restarted the distribution conveyor resumes its movement thereby moving the target of the preselected cart out of alignment with sensing unit 276 and immediately thereafter moving tab 286 into contact with the switch actuating arm 284 of limit switch mechanism 282. The switch mechanism 282 is connected to conventional control circuitry to reset to sensing unit 276 so that it will automatically stop the conveyor when the next targeted cart comes into alignment therewith.

FIG. 10 is a plan view illustrating a stacker crane elevator C1 sideshifted into driving engagement with a selected cart 30 whereby friction drive wheel 204 is in driving engagement with wheel 242 in order that a load may be transferred between the conveyors 32a and 30a. As will be apparent from the drawings, the sideshifting movement of the stacker crane elevator C1 toward a cart conveyor 30a is greater than the sideshifting movement of the elevator toward a compartment conveyor 24a.

Although the best mode contemplated for carrying out the present invention has been herein shown and described it will be apparent that modification and variation may be made without departing from what is regarded to be the subject matter of the invention.

What is claimed is:

1. A freight handling terminal system comprising, in combination, at least one row of columns of vertically stacked staging compartments, each compartment including a conveyor means adapted to support and convey goods, a plurality of stacker cranes each being movable along a predetermined segment of a horizontal path extending alongside the compartment row, each stacker crane having an elevator thereon arranged for vertical travel, a conveyor means mounted on each elevator for supporting and conveying goods, a distribution conveyor comprised of a series of uniformly spaced interconnected carts movable along a path extending parallel to the paths of the cranes, each cart having a conveyor means thereon arranged to support and convey goods, means for intermittently moving said distribution conveyor through distances corresponding to said predetermined segment of said horizontal path through which each crane can be moved in order to move adjacent series of said carts from the operating area of one stacker crane to the operating area of the adjacent stacker crane, and means for positioning each crane elevator in alignment with any compartment or with any cart of said distribution conveyor which is in its operating area for effecting the transfer of loads therebetween.

2. The system set forth in claim 1 wherein each of said conveyor means comprises an endless belt conveyor.

3. The system set forth in claim 1 including means for sideshifting each of said conveyor means that is mounted on one of said elevators toward a compartment conveyor means or toward a cart conveyor means aligned therewith, and means for mechanically coupling the aligned conveyor means so that they can coact to effect transfer of a load from one conveyor means to the other.

4. The system set forth in claim 3 wherein each conveyor means that is mounted on one of said elevators includes a friction drive wheel, each cart supported conveyor means including an engagement wheel, and each compartment conveyor means including an engagement wheel, said sideshifting of each elevator supported conveyor means being effective to place its friction drive wheel into driving engagement with the engagement wheel of an aligned cart supported conveyor means or compartment conveyor means, and means for driving said elevator supported conveyor means and its associated friction drive wheel to simultaneously drive an aligned cart supported conveyor means or compartment conveyor means through its associated engagement wheel.

5. The system set forth in claim 1 wherein the carts are interconnected by a tow chain.

6. The system set forth in claim 1 wherein the distribution conveyor travels along a closed loop path.

7. The system set forth in claim 6 wherein a second row of columns of vertically stacked staging compartments is provided opposite said one row to form an aisle between the rows wherein said stacker cranes are situated, each compartment of the second row having a conveyor means adapted to support and convey goods and being arranged to be aligned with the conveyor means of one of said stacker cranes to effect the transfer of loads therebetween.

8. The system set forth in claim 1 wherein each elevator mounted conveyor means includes a drive means to drive said elevator mounted conveyor means and wherein the conveyor means of the staging compartments and the carts each include a drivable means that can be driven by the drive means of an elevator supported conveyor means when an elevator supported conveyor means is in alignment with one of said staging compartment or cart conveyor means.

9. A freight handling terminal system comprising, in combination, a row of staging compartments, a plurality of stacker cranes movable in a path parallel to the compartment row, each stacker crane including an elevator, each elevator having a conveyor means supported thereon that is arranged to support and convey goods, each compartment having a conveyor means adapted to support and convey goods, a distribution conveyor of interconnected carts, means for moving said distribution conveyor along a conveyor path parallel to the stacker crane path, each cart having conveyor means thereon arranged to support and convey goods, the distribution conveyor being movable to index its carts along the conveyor path to bring different carts within the operating area of each of said stacker cranes so that loads can be transferred from one stacker crane to another, means for moving each of said elevator supported conveyor means into alignment with each of said cart conveyor means and compartment conveyor means within the operating area of its associated stacker crane, means for driving each of said elevator supported conveyor means, and means on each of said cart conveyor means and compartment conveyor means arranged to coact with said elevator supported conveyor means when said elevator supported conveyor means is aligned therewith for effecting the drive of said cart conveyor means or compartment conveyor means so that goods can be conveyed between the coacting conveyor means.

10. The system set forth in claim 9 wherein the elevator supported conveyor means includes a friction drive wheel arranged to be driven by said elevator conveyor drive means, each of said compartment conveyor means including an engagement wheel affixed to a shaft that can be rotated to set the compartment conveyor means into motion, each of said cart conveyor means including an engagement wheel affixed to a shaft that can be rotated to set the cart conveyor means into motion, and means for sideshifting the elevator supported conveyor means to engage its friction drive wheel with the engagement wheel of a compartment conveyor means or of a cart conveyor means.

11. A freight handling terminal system comprising at least one row of adjacent stacked columns of staging compartments, a plurality of stacker cranes movable along a horizontal path adjacent to said staging compartment row, each of said stacker cranes being movable over an equal segment of said path whereby said row of staging compartments is comprised of a plurality of equal sections defined by the operating zone of an adjacent stacker crane, a distribution conveyor movable in a path adjacent to and parallel to said horizontal path of said stacker cranes, said distribution conveyor being comprised of a plurality of uniformly spaced interconnected carts, means for indexing said distribution conveyor along said path in increments corresponding to the segments of said stacker crane path whereby each time that said distribution conveyor is indexed a new set of carts will be brought into the operating zone of each stacker crane, and means for transferring loads between each of said stacker cranes and the distribution conveyor carts and staging compartments within its operating zone whereby a load can be transferred from one staging compartment section to another staging compartment section by means of transfers to and from said distribution conveyor by a pair of said stacker cranes.

12. A freight handling terminal system as set forth in claim 11 wherein said distribution conveyor extends in a closed loop path.

13. A freight handling terminal system as set forth in claim 12 including a second row of adjacent stacked columns of staging compartments arranged adjacent to the path of said distribution conveyor and generally parallel to said one row of adjacent stacked columns of staging compartments.

14. A freight handling terminal as set forth in claim 11 wherein the distance between adjacent carts in said distribution conveyor corresponds to the distance between adjacent columns of staging compartments in said staging compartment row.

15. A freight handling terminal system comprising a plurality of stacker cranes each having an elevator thereon for movement in a vertical plane, a row of adjacent stacked columns of staging compartments arranged adjacent to said stacker cranes, a distribution conveyor movable in a path adjacent to said row of staging compartments, said distribution conveyor being comprised of a plurality of interconnected carts, means for intermittently driving said distribution conveyor to bring said carts from the operating area of one stacker crane to the operating area of another stacker crane, each of said carts being provided with conveyor means, each elevator being provided with conveyor means, means for selectively moving the elevator conveying means into engagement with a cart conveying means to transfer loads therebetween, and means associated with each elevator conveying means for powering the cart conveying means when said two conveying means are brought into engagement whereby loads are arranged to be transferred in said terminal by said one stacker crane which takes a load from one staging compartment and moves it onto a cart which will then index the load to said other stacker crane which can remove the load from the cart and transfer it to another staging compartment.

16. In a freight handling terminal for transferring freight to and from freight carriers wherein said terminal comprises a row of adjacent stacked columns of staging compartments, a plurality of stacker cranes operable along a path adjacent to and parallel to said row of staging compartments, said path being comprised of a plurality of equal segments with each segment being defined by the operating zone of one of said stacker cranes, and a plurality of boom conveyors for transferring freight between said freight carriers and said stacker cranes, each of said stacker cranes being provided with means for selectively placing said freight into said staging compartments, the improvement comprising a distribution conveyor arranged to run in a path adjacent to and parallel to said row of staging compartments and said stacker crane path, said distribution conveyor being comprised of a plurality of interconnected uniformly spaced carts, and means for indexing said distribution conveyor in increments corresponding to said segments of said stacker crane path whereby each indexing movement of said distribution conveyor brings a new set of carts to each of said stacker cranes so that freight can be transferred via said distribution conveyor from one stacker crane to another stacker crane.

17. In a freight handling terminal for transferring freight to and from freight carriers wherein said terminal comprises a row of adjacent stacked columns of staging compartments, a plurality of stacker cranes operable along a path adjacent to and parallel to said row of staging compartments, and a plurality of boom conveyors for transferring freight between said freight carriers and said stacker cranes, the improvement comprising a distribution conveyor arranged to run in a path adjacent to and parallel to said row of staging compartments and said stacker crane path, said distribution conveyor being comprised of a plurality of interconnected carts, means for indexing said distribution conveyor for bringing a cart from the operating area of one stacker crane to the operating area of another stacker crane in order to transfer freight therebetween, each of said carts being provided with conveyor means, and each of said stacker cranes being provided with conveyor means for transferring freight to or from said staging compartments and for transferring freight to or from said conveyor means on said carts, each of said cart conveyor means being arranged to be powered by a stacker crane conveyor means in order to effect the transfer of freight therebetween.

* * * * *